United States Patent [19]

Shumard et al.

[11] Patent Number: 5,544,922
[45] Date of Patent: Aug. 13, 1996

[54] WEDGE ASSEMBLY RESTRAINT

[75] Inventors: Dennis D. Shumard; Michael L. Lundstrom, both of Eastland, Tex.

[73] Assignee: EBAA Iron, Inc., Eastland, Tex.

[21] Appl. No.: 425,874

[22] Filed: Apr. 21, 1995

[51] Int. Cl.$^6$ .................................................. F16L 55/00
[52] U.S. Cl. ........................... 285/23; 285/337; 285/374; 285/404; 285/906
[58] Field of Search .................................. 285/337, 374, 285/404, 421, 23, 906

[56] References Cited

U.S. PATENT DOCUMENTS

| | | |
|---|---|---|
| 1,083,697 | 1/1914 | Neptune . |
| 2,744,769 | 5/1956 | Roeder et al. . |
| 3,173,266 | 3/1965 | Shutt . |
| 3,233,497 | 2/1966 | McCormick . |
| 3,359,021 | 12/1967 | Wurzel et al. . |
| 3,389,923 | 6/1968 | Love, Jr. et al. . |
| 3,781,042 | 12/1973 | Estlick ............................... 285/404 X |
| 4,092,036 | 5/1978 | Sato et al. . |
| 4,627,774 | 12/1986 | Bradley . |
| 4,647,083 | 3/1987 | Hashimoto ........................... 285/374 X |
| 4,664,426 | 5/1987 | Ueki ....................................... 285/337 |
| 4,775,273 | 10/1988 | Bauer . |
| 4,779,900 | 10/1988 | Shumard . |
| 4,810,144 | 3/1989 | Martelli . |
| 4,848,808 | 7/1989 | Pannell et al. ........................... 285/337 |
| 4,896,903 | 1/1990 | Shumard . |
| 4,934,888 | 6/1990 | Corsmeier et al. . |
| 5,071,175 | 12/1991 | Kennedy ................................... 285/337 |

OTHER PUBLICATIONS

Brochure entitled "Wedge Action Megalug$^{198}$ Field Installed Joint Restraint," EBAA Iron Sales, Inc.

*Primary Examiner*—Dave W. Arola
*Attorney, Agent, or Firm*—Randall C. Brown; James F. Struthers

[57] ABSTRACT

A wedge assembly restraint, featuring clip stops and a flexible, resilient retainer clip, for restraining a wedge assembly in the clamping block of a pipe junction holder.

21 Claims, 4 Drawing Sheets

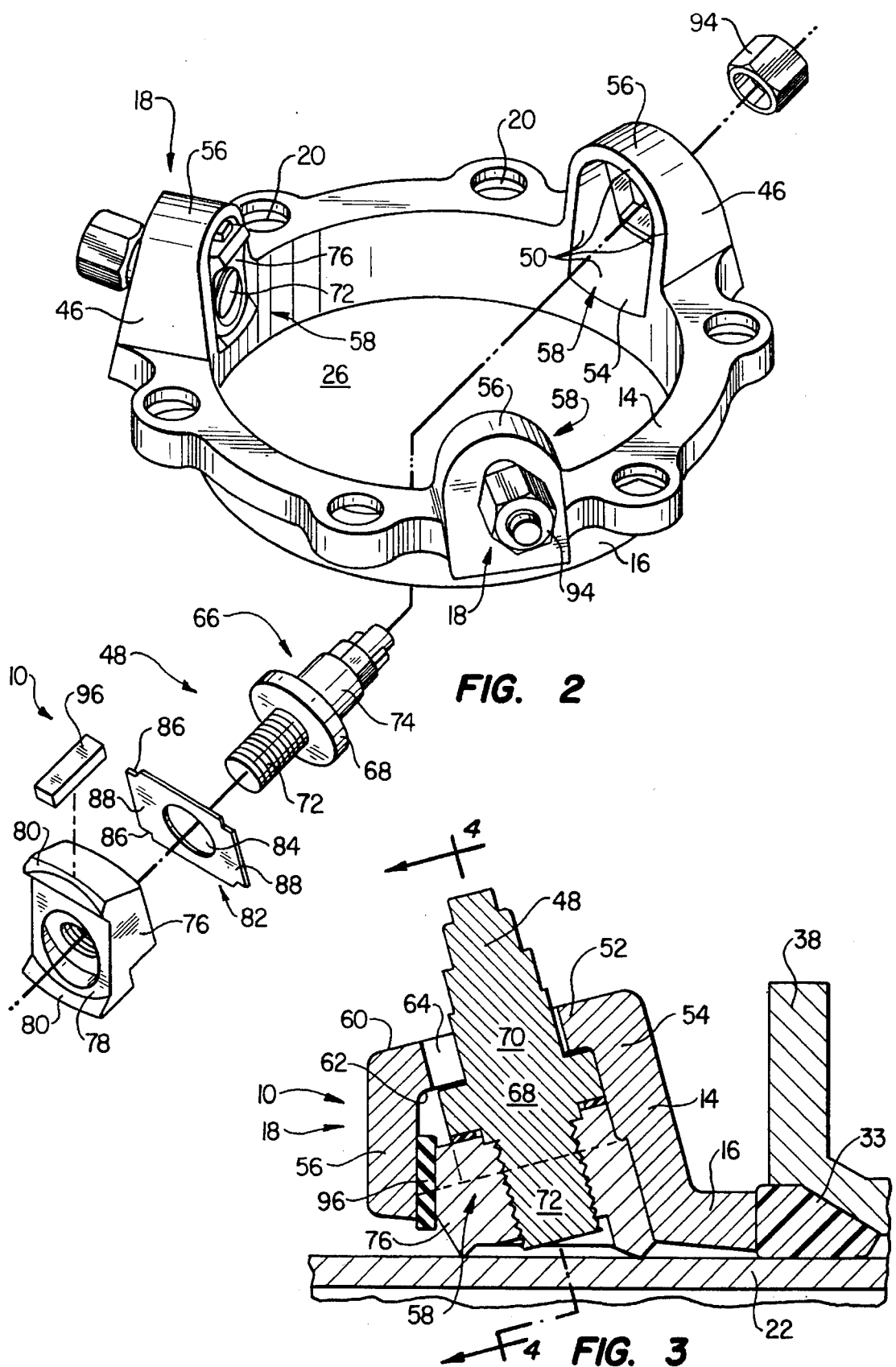

5,544,922

WEDGE ASSEMBLY RESTRAINT

BACKGROUND OF THE INVENTION

1. Field of the Invention

The present invention relates to a wedge assembly restraint featuring a retainer clip. The wedge assembly restraint has particular utility in connection with the assembly, transportation, and installation of a pipe junction holder such as the holder described in U. S. Pat. No. 4,092,036 to Sato et al., the entire disclosure of which is incorporated herein by reference.

2. Description of Related Information

It is frequently desirable to connect a pair of axially aligned pipes such that a tight fit and suitable seal are formed therebetween. It is also desirable to prevent the disengagement that could occur when pressure is applied in the axial direction.

It is known in the prior art to employ special pipes and a pipe junction holder to accomplish this purpose. A first pipe is adapted to be received within a second pipe having an enlarged mouth, a packing cavity, and a terminal flange. An annular pipe junction holder is connected to both the outer surface of the first pipe and the terminal flange of the second pipe, so as to hold the two pipes together.

The Sato patent discloses a pipe junction holder comprising a substantially annular body having an annular projection. The annular body is connected to the terminal flange of the second pipe using conventional flange-mating means, such as a series of axially aligned bolts placed through holes in the terminal flange and engaged with holes formed in the wall of the annular body. The annular projection abuts against packing placed in the packing cavity of the second pipe.

The pipe junction holder is connected to the first pipe using a plurality of clamping assemblies uniformly distributed around the annular body. The clamping assemblies comprise a clamping block and a wedge assembly. The Sato patent discloses that at least three clamping assemblies are employed although two clamping assemblies may be used in practice.

Each clamping block is defined by a plurality of integral sidewalls, a radially outer wall, and an open mouth, wherein the sidewalls include a front sidewall integral to the annular body and a rear sidewall opposite the front sidewall. The clamping block extends axially away from the annular body of the pipe junction holder, such that the open mouth faces the peripheral wall of the first pipe when the pipe junction holder is installed thereon. The radially outer wall is inclined with respect to the longitudinal axis of the pipe and has an elliptical hole therein.

Each wedge assembly comprises an internally reverse-threaded pipe-pressing member and a collar bolt.. The collar bolt has an annular flange formed integral with its shank and is threaded therebelow to engage the pipe-pressing member. The upper portion of the collar bolt is unthreaded.

In operation of the pipe junction holder, the pipe-pressing member is partially engaged on the threaded side of the collar bolt, below the annular flange. -The collar bolt and engaged pipe-pressing member are received within the clamping block such that the annular flange slidably abuts the internal surface of the radially outer wall, and such that the upper portion of the collar bolt protrudes through the elliptical hole. A rubber spacer is placed between the wedge assembly and the rear sidewall of the clamping block to keep the wedge assembly in a forward orientation during installation.

Because the pocket of the clamping block is shaped so as to prevent the pipe-pressing member from turning, and because the annular flange prevents radially outward motion of the collar bolt, rotating the upper portion of the collar bolt causes the pipe-pressing member to travel down the bolt shank and towards the pipe. By, employing a pipe-pressing member with edges that can bite into or penetrate the peripheral wall of a pipe, and by turning the bolt in each clamping block to a suitable torque, the pipe junction holder is secured to the pipe.

Proper torque of the wedge assemblies may be obtained by providing a nut designed to shear at a predetermined torque (hereinafter, a "twist-off" nut). A suitable twist-off nut is disclosed in U.S. Pat. No. 4,627,774 to Bradley, the entire disclosure of which is incorporated herein by reference.

It is desirable to restrain a wedge assembly in its clamping block prior to installation and in the event the pipe junction holder is removed or reinstalled. Once attached, a twist-off nut restrains a wedge assembly in its clamping block since the head of the nut is of greater diameter than the elliptical hole in the clamping block. However, prior to installation of the twist-off nut and after the nut is sheared off, wedge assemblies can fall out of their clamping blocks and can get lost or damaged as a result. Loss or damage can also occur where the twist-off nut is inadvertently sheared off due to abrupt shock or other trauma during transportation, storage, or installation.

The loss of wedge assemblies prior to assembly of the pipe junction holder and in the event the pipe junction holder is removed or reinstated is a source of irritation, inconvenience, and expense for end users of the pipe junction holder. In addition, during the initial assembly of the pipe junction holder, the lack of an independent restraint on the wedge assemblies prior to installation of the twist-off nuts prevents preassembly of the wedge assemblies into the pipe junction holder, resulting in decreased efficiency.

In the past, wedge assembly restraints suffered from low reliability, excessive expense, and burdensome manufacturing requirements. For example, the inclusion of the retainer ring disclosed in the Satopatent added to the expense of the device and increased the processing of the individual parts. In addition, use of the retainer ring added expense and inefficiency at the manufacturing stage because a press was required to assemble the parts. Machining grooves into the collar bolts to provide a positive stop for the retainer rings provided a consistent hold but also added two significant steps to the manufacturing process.

A need exists, therefore, for a simple and inexpensive device that can reliably restrain a wedge assembly in a clamping block of a pipe junction holder. Such a device should restrain the wedge assembly from preassembly through installation or reinstallation, and should function whether or not a twist-off nut is in place. Also, such a device should not hinder operation of the pipe-pressing member either in wedge actuation during installation or movement of the pipe-pressing member during operation.

SUMMARY OF THE INVENTION

The apparatus of the present invention overcomes the above-mentioned disadvantages and drawbacks which are characteristic of the related information. The apparatus of the present invention restrains a wedge assembly in a clamping block with only minor modifications to the design, assembly, and use of the pipe junction holder.

According to the apparatus of the present invention, the prior art clamping assembly is modified by the addition of a retainer clip to the wedge assembly and by the addition of one or more clip stops to opposing sidewalls of the clamping block.

The retainer clip is engaged on the collar bolt shank below the annular flange and above the pipe-pressing member. In a preferred embodiment, the retainer clip is substantially rectangular, having an aperture at its center. The aperture is adapted to be engaged on the collar bolt shank such that the portions of the clip which extend beyond the bolt shank form two retaining flaps. Each clip stop comprises an indentation in a sidewall of the clamping block such that a groove is defined at the opening of the clamping block mouth.

In operation of the wedge assembly retainer of the present invention, a wedge assembly equipped with a retainer clip is pushed into a clamping block. The extended retaining flaps engage the sidewalls of the clamping block, or grooves in the sidewalls of the clamping block, causing the retaining flaps to elastically bend toward the pipe-pressing member. The wedge is pushed further into the clamping block until the retaining flaps spring partially outward into the indentations. Because the indentations are insufficiently deep to allow full extension of the flaps, movement of the wedge assembly out of the clamping block is restrained.

In a preferred embodiment, the corners of the retainer clip are notched to provide added forward clearance. The notches allow the wedge assembly to travel farther forward in the clamping block, as compared with an unnotched clip, without being blocked due to interference between the retainer clip and the sidewalls of the clamping block.

In an alternate preferred embodiment, an additional "spacer" flap is added to the retainer clip. The alternate retainer clip is engaged on the collar bolt shank and then rotated until the spacer flap extends toward the rear sidewall of the clamping block and the retaining flaps extend toward the indentations. The retaining flaps operate as described above. When the wedge assembly is pushed into the clamping block, the extended spacer flap engages the clamping block causing the flap to elastically bend toward the pipe-pressing member such that the wedge assembly is pushed forward in the pocket of the clamping block, obviating the need for a rubber spacer. In an alternate embodiment, the spacer flap engages a clamping block groove, and restrains movement of the wedge assembly out of the clamping block in a manner similar to the retainer clip.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

BRIEF DESCRIPTION OF THE DRAWINGS

FIG. 2 is an exploded perspective view of the wedge assembly restraint of the present invention and the pipe junction holder shown in FIG. 1;

FIG. 3 is a section view taken along line 3—3 of FIG. 1;

DESCRIPTION OF THE PREFERRED EMBODIMENTS

Figure 1:
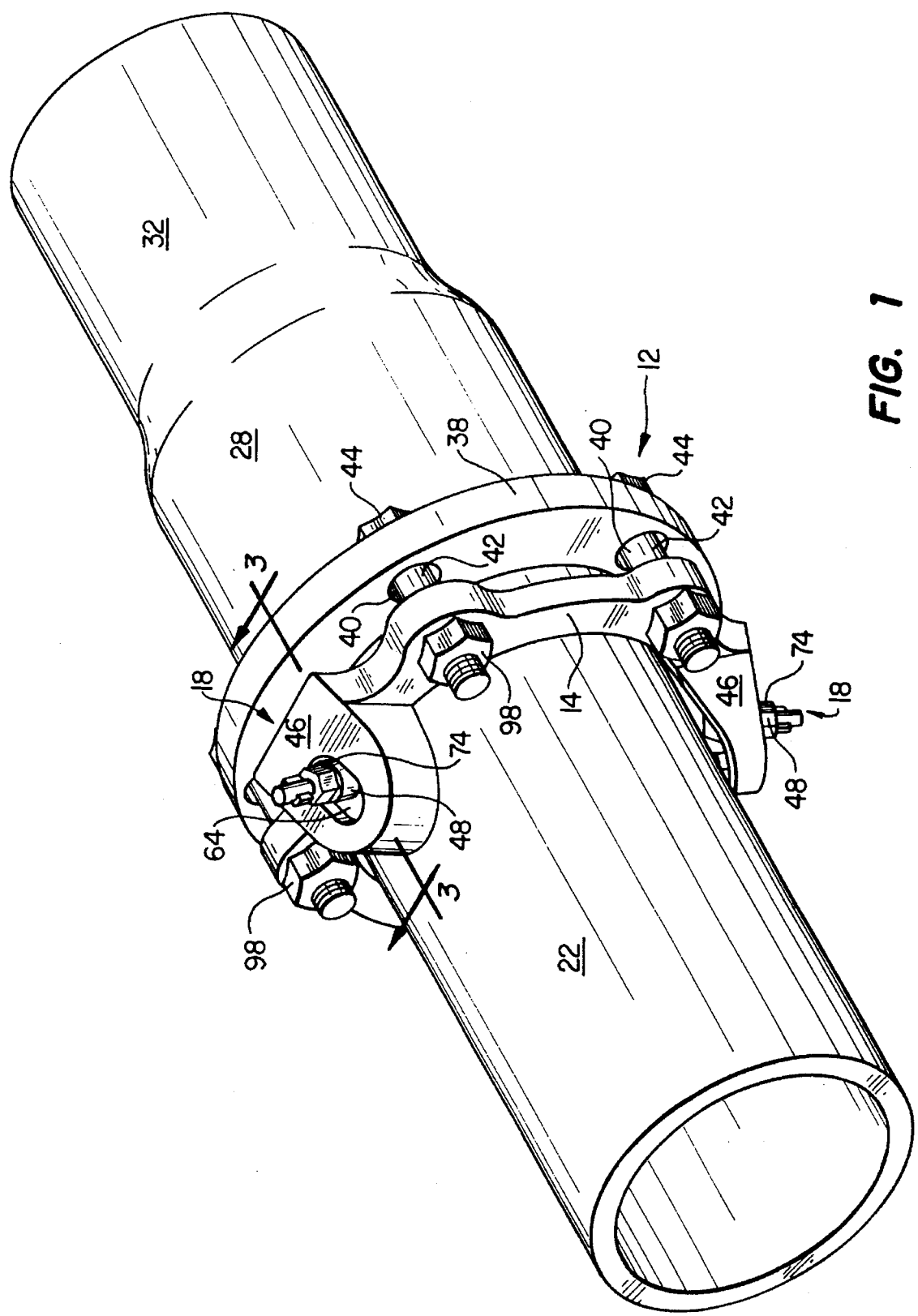
FIG. 1 is a perspective view of an installed pipe junction holder.
Figure 4:
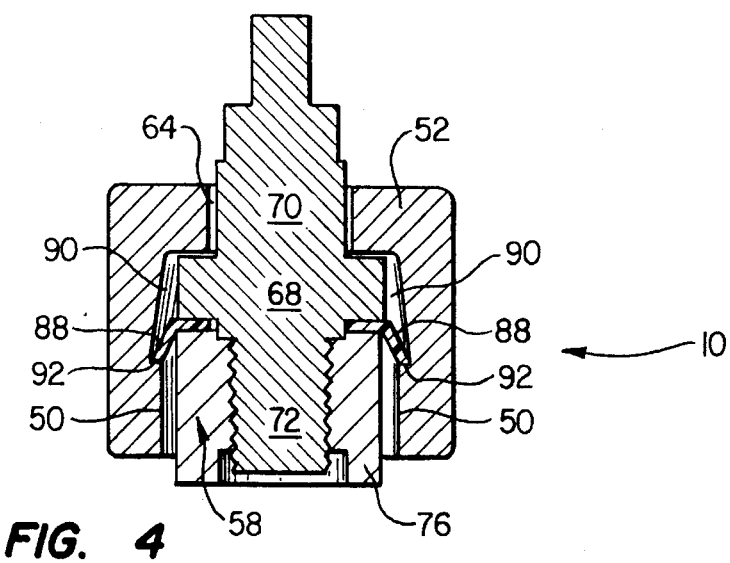
FIG. 4 is a section view taken along line 4—4 of FIG.
Figure 5:
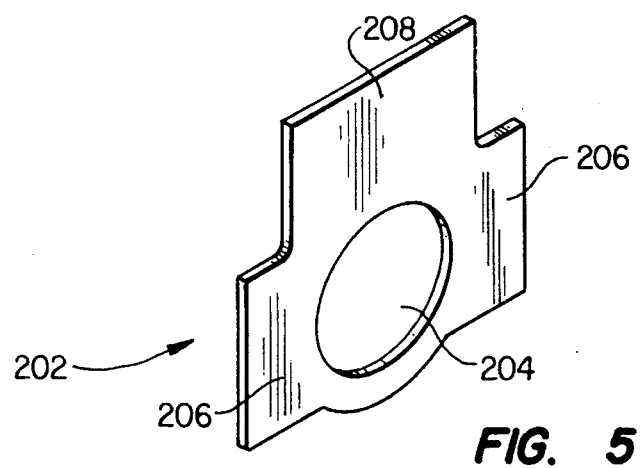
FIG. 5 is a perspective view of an alternate embodiment of a retainer clip for a wedge assembly restraint of the present invention.
Figure 6:
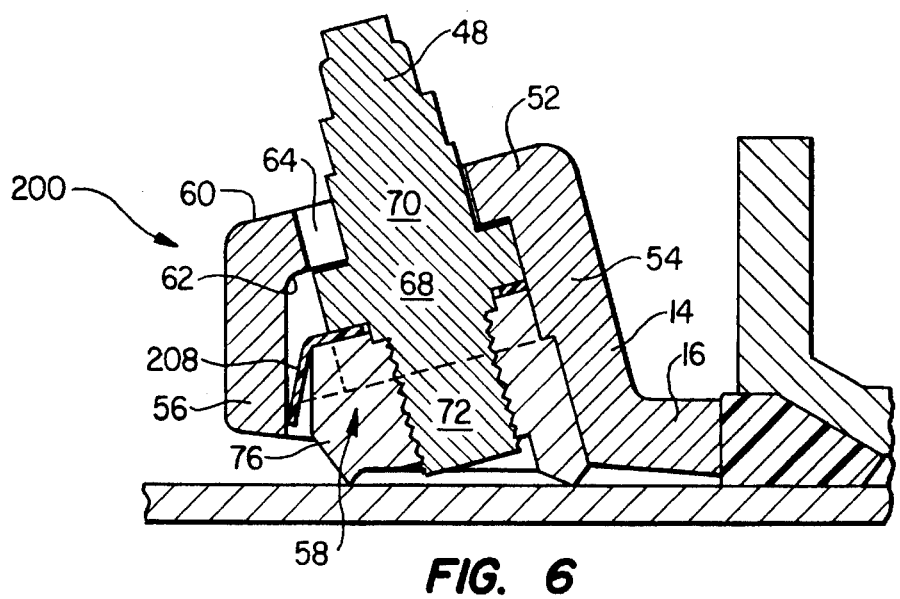
FIG. 6 is a section view of a wedge assembly restraint of the present invention including the retainer clip of FIG. 5.

Referring now to the drawings, and particularly to FIGS. 1–4, a preferred embodiment of the wedge assembly restraint of the present invention is shown and generally designated by the reference numeral 10.

The wedge assembly restraint 10 of the present invention is used in connection with a pipe junction holder 12 as is shown in FIG. 1. The pipe junction holder 12 comprises a substantially annular body 14, an annular projection 16, two or more clamping assemblies 18 disposed at equal intervals on the annular body 14, and a plurality of holes 20 extending in parallel with the longitudinal axis of a pipe 22 on which the pipe junction holder 12 is mounted. As shown in FIG. 2, the pipe junction holder 12 may include three clamping assemblies 18.

An end (not shown) of the pipe 22 is inserted into the annular space 26 defined by the annular body 14. The end of the pipe 22 is then coupled into an enlarged mouth 28 formed at an opposed end (not shown) of a pipe 32. Preferably, packing material 33 is provided at the opening portion of the enlarged mouth 28 for providing a seal. The opposed end of the pipe 32 comprises an annular flange 38 having a plurality of through holes 40 oriented in parallel with the longitudinal axis of the pipe 32.

When the pipe junction holder 12 is mounted on the pipe 22, the annular body 14 is rotated such that the holes 20 are axially aligned with the through holes 40 and such that a bolt 42 with a head 44 may pass through both holes 20, 40. As the annular body 14 is connected to the flange 38, the annular projection 16 pushes against the packing material.

Each clamping assembly 18 comprises a clamping block 46 adapted to receive a wedge assembly 48. Each clamping block 46 comprises a plurality of integral sidewalls 50, an open mouth 58, and an integral radially outer wall 52, wherein the integral walls 50 include a front wall 54 integral with the annular body 14 and a rear wall 56 opposite the front wall 54, and wherein the clamping blocks 46 extend axially from the side of the annular body 14, such that the mouth 58 of each clamping block 46 faces the pipe 22 when the pipe junction holder 12 is installed thereon.

The radially outer wall 52 of each clamping block 46 comprises an external side 60, an internal side 62, and a non-threaded, substantially elliptical hole 64. The radially outer wall 52 and the longitudinal axis of the elliptical hole 64 are inclined with respect to the longitudinal axis of the first pipe 22.

Each wedge assembly 48 comprises a collar bolt 66 having an integral annular flange 68 formed on its shank 70, having a threaded portion 72 below the flange 68, and having an upper portion 74 above the flange 68. The upper portion 74 of the collar bolt 66 is adapted to be received in the elliptical hole 64 from the internal side 62 of the radially outer wall 52 before the annular body 14 is fixed on the pipe 22.

The annular flange 68 prevents the wedge assembly from passing through the hole 64 in the radially outer wall 52. Those of ordinary skill in the art will recognize that other arrangements can prevent passage through the hole 64, including the use of a stepped bolt diameter, wherein the diameter of the lower portion of the bolt is greater than that of the hole 64.

Each wedge assembly 48 further comprises an internally reverse-threaded pipe-pressing member 76 mounted on the threaded portion 72 of the shank 70 and adapted to be received within the mouth 58 of each clamping block 46 when the wedge assembly 48 is placed therein, such that the pipe-pressing member 76 is prevented from turning. The bottom surface 78 of the pipe-pressing member 76 includes a pair of edges 80 that are adapted to securely bite into the wall of the pipe 22.

In a preferred embodiment, the wedge assembly restraint 10 of the present invention comprises a substantially rectangular retainer clip 82 preferably made of a resilient, flexible plastic material, having an aperture 84 adapted to engage the threaded portion 72 of the collar bolt 66, and having notches 86 disposed at the corners of the clip 82. When the retainer clip 82 is disposed on the collar bolt 66, two retaining flaps 88 are defined by the portions of the retainer clip 82 that extend beyond the threaded portion 72 of the collar bolt 66.

Figure 7:
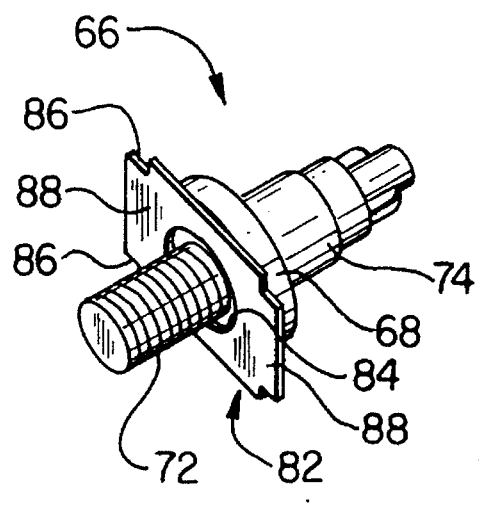
FIG. 7 is a perspective view of a wedge assembly and integral retainer clip according to the present invention.
Figure 8:
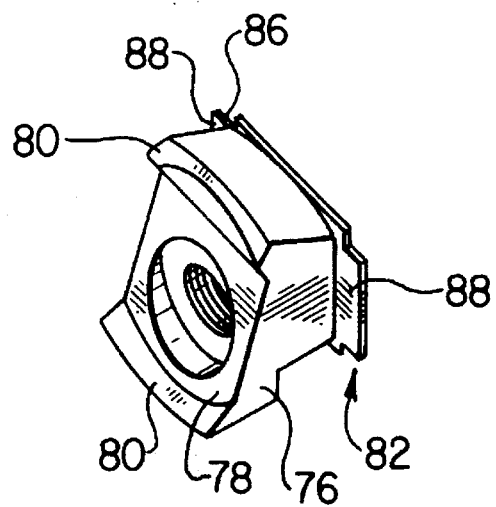
FIG. 8 is a perspective view of a pipe-pressing member and integral retainer clip according to the present invention.

Although shown as a separate piece in FIG. 2, those of ordinary skill in the art will recognize that the retainer clip of the present invention may alternatively be integral with either the bottom of the flange 68 (FIG. 7) or the top of the pipe-pressing member 76 (FIG. 8).

Each wedge assembly restraint 10 further comprises two retainer clip-stops 90 each adapted to receive a retaining flap 88. The clip stops 90 comprise indentations in opposing sidewalls 50 of each clamping block 48, such that a groove 92 is defined at the mouth of the clamping block 48 and such that each indentation tapers as it proceeds toward the internal side 62 of the radially outer wall 52. The depth of the clip stop indentation at the groove 92 is of smaller magnitude than would allow a retaining flap 88 to fully extend therein.

Those of ordinary skill in the art will recognize that a variety of shapes may be employed for the retainer clip and the clip stop indentations. Any combination that provides retainer flaps that extend beyond the bolt shank, that allows the retainer flaps to elastically bend upon initial insertion of the wedge assembly, and that allows sudden, partial extension of the retaining flaps thereafter, will restrain the wedge assembly. Where a wedge-shaped indentation is employed, those of ordinary skill in the art will recognize that the length and depth of the indentation may be varied to allow more or less motion of a secured wedge assembly.

In operation of the wedge assembly restraint 10, the retainer clip 82 is initially engagingly deployed below the annular flange 68 of the collar bolt 66 on the threaded portion 72 of the shank 70° The pipe-pressing member 76 is then mounted on the threaded portion 72 of the shank 70 such that the retainer clip 82 is disposed between the pipe-pressing member 76 and the annular flange 68.

As a wedge assembly 48 is pushed into the mouth 58 of a clamping block 46, the retaining flaps 88 of the retainer clips 82 catch the clamping block groove 92 and bend toward the pipe-pressing member 76. When a retaining flap 88 reaches the clip stop indentation 90, the retaining flap 88 springs partially outward into the stop 90, thereby preventing the wedge assembly 48 from falling out of the mouth 58 of the clamping block 46. Simultaneously with the insertion of each wedge assembly 48 into each mouth 58 of the clamping blocks 46, a rubber spacer 96 may be deployed between each wedge assembly 48 and each rear wall 56 of the clamping block 46 to help keep the wedge assemblies 48 properly positioned during installation.

Once the wedge assemblies 48 are restrained by the retainer clips 82, twist-off nuts 94 may be attached in accordance with U.S. Pat. No. 4,627,774.

In subsequent installation of the pipe junction holder 12, the pipe 22 is inserted within the annular space 26 defined by the annular body 14. The annular body 14 is then rotated until the holes 20 in the annular body 14 and the holes 40 in the flange 38 are aligned, such that bolts 42 may be inserted therethrough and engagingly mated with complementary nuts 98.

The nuts 98 and bolts 42 are then tightened such that the annular body 14 and flange 38 are drawn closer together and such that the annular projection 14 sealingly abuts against the packing material in the pipe 32. Each twist-off nut 94 is then rotated until the twist-off nut 94 shears off, thereby obtaining the initial pipe holding force.

In an alternate embodiment of the wedge assembly restraint 200 of the present invention, a retainer clip 202, preferably made of resilient, flexible plastic material, has a circular aperture 204 adapted to receive the threaded end 72 of the collar bolt 66, two parallel retaining flaps 206, and a spacer flap 208 perpendicular to the retaining flaps 206. The wedge assembly 48 is assembled with the retainer clip 202 and installed as is described, above. When the wedge assembly is pushed into the pocket of the clamping block 46, the retaining flaps 206 and the spacer flap 208 bend toward the pipe-pressing member 76 allowing the wedge assembly 48 to be inserted within the clamping block. The spacer flap 208 elastically pushes against the rear wall 56 when the wedge assembly 48 is fully inserted, to keep the wedge assembly 48 forward during installation.

While preferred embodiments of the invention have been shown and described, it will be understood by persons skilled in the art that various changes and modifications may be made without departing from the spirit and scope of the invention which is defined by the following claims.

What is claimed is:

1. A wedge assembly restraint, comprising:
    a) means for receiving a wedge assembly, said receiving means being defined by a plurality of sidewalls, an open mouth, and an outer wall having a hole, wherein at least one of said plurality of sidewalls comprises a groove; and
    b) a wedge assembly inserted in said mouth of said receiving means, said wedge assembly comprising:
        a bolt having a first ends a second end, and means for preventing said bolt from passing through said hole in said outer wall, said preventing means being intermediate said first end and said second end of said bolt;
        a pipe-pressing member engaged with said bolt; and
        means for retaining said wedge assembly within said mouth of said receiving means, said retaining means being engaged with a member of the group consisting of said bolt and said pipe-pressing member and comprising at least one flap;
    wherein said at least one flap of said retaining means engages said groove of said at least one sidewall to retain said wedge assembly within said receiving means.

2. A wedge assembly restraint according to claim 1 wherein said retaining means is integral with said preventing means.

3. A wedge assembly restraint according to claim 1 wherein said retaining means is integral with said pipepressing member.

4. A wedge assembly restraint according to claim 1 wherein said retaining means is mounted on said bolt and is interposed between said preventing means and said pipepressing member.

5. The wedge assembly restraint of claim 4 wherein said preventing means comprises an annular flange having an outer diameter larger than the diameter of said hole.

6. The wedge assembly restraint of claim 4 wherein said retaining means is formed of a resilient plastic material.

7. The wedge assembly restraint of claim 4 wherein said retaining means has corners and further comprises a notch at each said corner.

8. The wedge assembly restraint of claim 4 wherein said retaining means further comprises a circular aperture of diameter greater than the diameter of said bolt.

9. The wedge assembly restraint of claim 8 wherein said retaining means is substantially rectangular and is symmetric about said aperture.

10. The wedge assembly restraint of claim 9 wherein said retaining means has corners and further comprises a notch at each said corner.

11. The wedge assembly restraint of claim 10 further comprising means for providing clearance between said wedge assembly and at least one of said sidewalls.

12. The wedge assembly restraint of claim 11 wherein said clearance means comprises a flexible, resilient spacer flap that extends from said retaining means.

13. The wedge assembly restraint of claim 12 wherein said spacer flap is substantially rectangular and extends perpendicularly to said flaps of said retaining means.

14. The wedge assembly restraint of claim 4 further comprising means for providing clearance between said wedge assembly and at least one of said sidewalls.

15. The wedge assembly restraint of claim 14 wherein said clearance means comprises a flexible, resilient spacer flap.

16. The wedge assembly restraint of claim 4 wherein said first end of said bolt is threaded, and wherein said pipe-pressing member is threadedly engaged on said first end of said bolt.

17. A wedge assembly positioner, comprising:
  a) means for receiving a wedge assembly, said receiving means being defined by a plurality of sidewalls, an open mouth, and an outer wall having a hole; and
  b) a wedge assembly inserted in said mouth of said receiving means, said wedge assembly comprising:
    a bolt having a first end, a second end, and means for preventing said bolt from passing through said hole in said outer wall, said preventing means being intermediate said first end and said second end of said bolt;
    a pipe-pressing member engaged with said bolt; and
    means for positioning said wedge assembly within said mouth of said receiving means, said positioning means being engaged with a member of the group consisting of said bolt and said pipe-pressing member and comprising at least one flap;
  wherein said at least one flap of said positioning means engages said sidewall to position said wedge assembly within said receiving means.

18. A wedge assembly restraint according to claim 17 wherein said positioning means is integral with said preventing means.

19. A wedge assembly restraint according to claim 17 wherein said positioning means is integral with said pipe-pressing member.

20. A wedge assembly restraint according to claim 17 wherein said positioning means is mounted on said bolt and is interposed between said preventing means and said pipe-pressing member.

21. The wedge assembly positioner of claim 20 wherein said preventing means comprises an annular flange having outer diameter larger than said hole.

* * * * *

UNITED STATES PATENT AND TRADEMARK OFFICE
CERTIFICATE OF CORRECTION

PATENT NO. : 5,544,922
DATED : August 13, 1996
INVENTOR(S) : Dennis D. Shumard et al.

It is certified that error appears in the above-indentified patent and that said Letters Patent is hereby corrected as shown below:

Column 1, line 61, delete "-".
Column 2, line 43, change "Satopatent" to -- Sato patent --.
Column 3, line 12, change "the-clip" to -- the clip --.
Column 3, line 64, after "FIG." (second occurrence), add -- 3; --.
Column 5, line 53, change "70°" to -- 70. --.
Column 5, line 57, change "assembly." to -- assembly --.
Column 6, line 47, change "ends" to -- end, --.
Column 6, line 66, change "pipep-ressing" to -- pipe-pressing --.
Column 7, line 3, change "pipep-ressing" to -- pipe-pressing --.

Signed and Sealed this

Fifth Day of November, 1996

Attest:

BRUCE LEHMAN

*Attesting Officer*           *Commissioner of Patents and Trademarks*